April 14, 1964 J. G. KAY ETAL 3,128,875
RECIPROCATING PUSHER-TYPE CONVEYOR
Filed Oct. 30, 1961 6 Sheets-Sheet 1
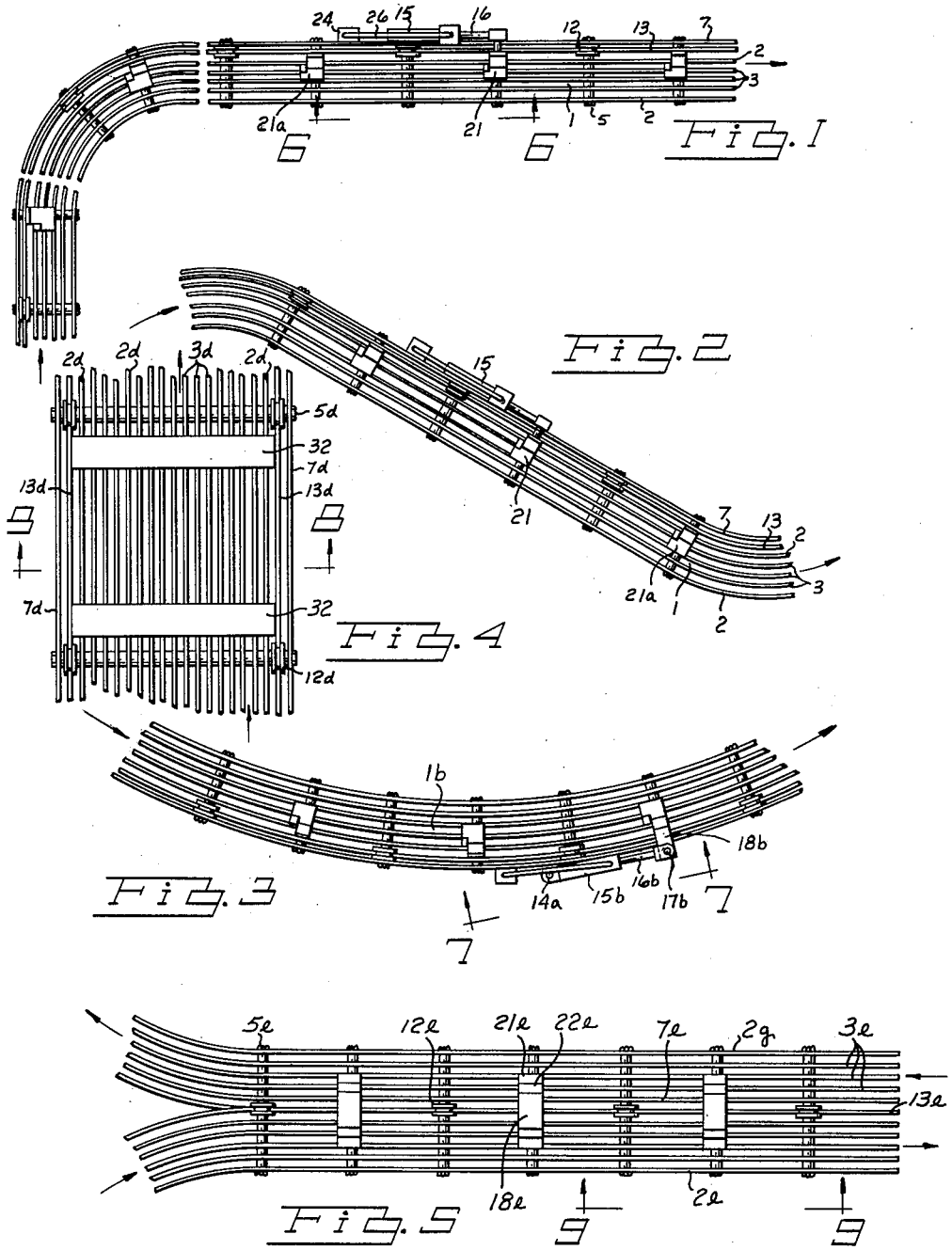
INVENTORS
JOHN G. KAY
ALFRED L. OSINSKI
BY
ATTORNEY

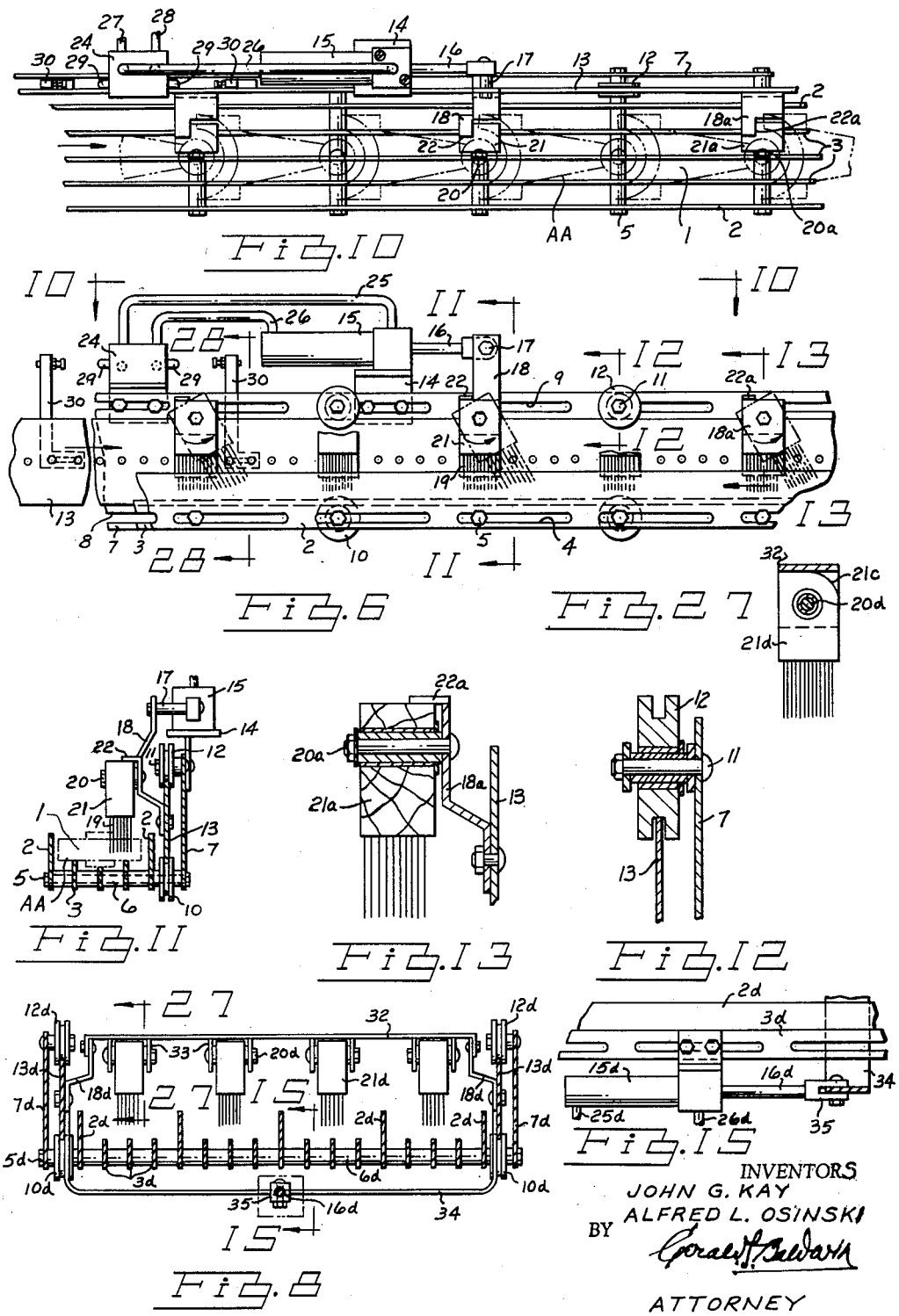

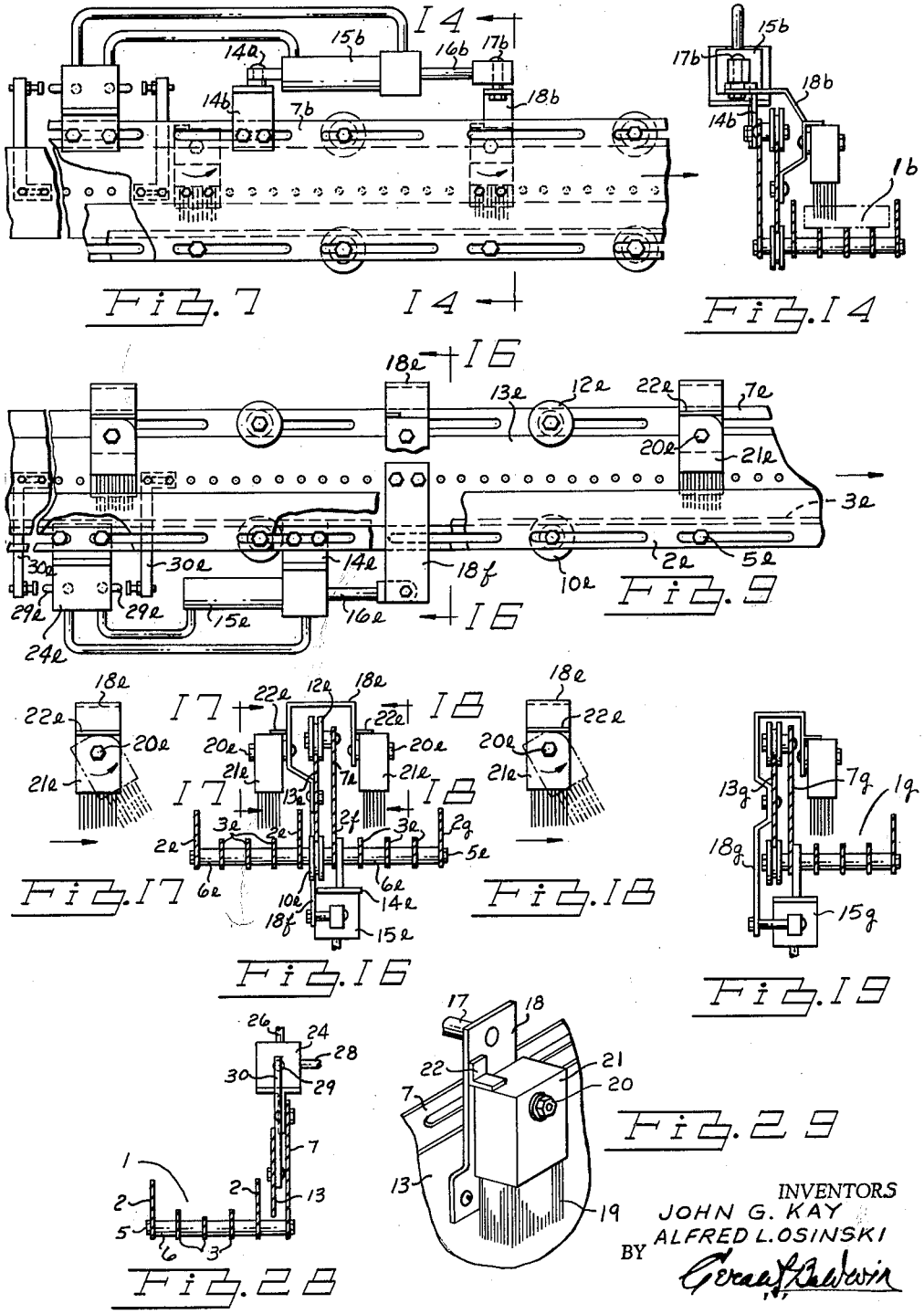

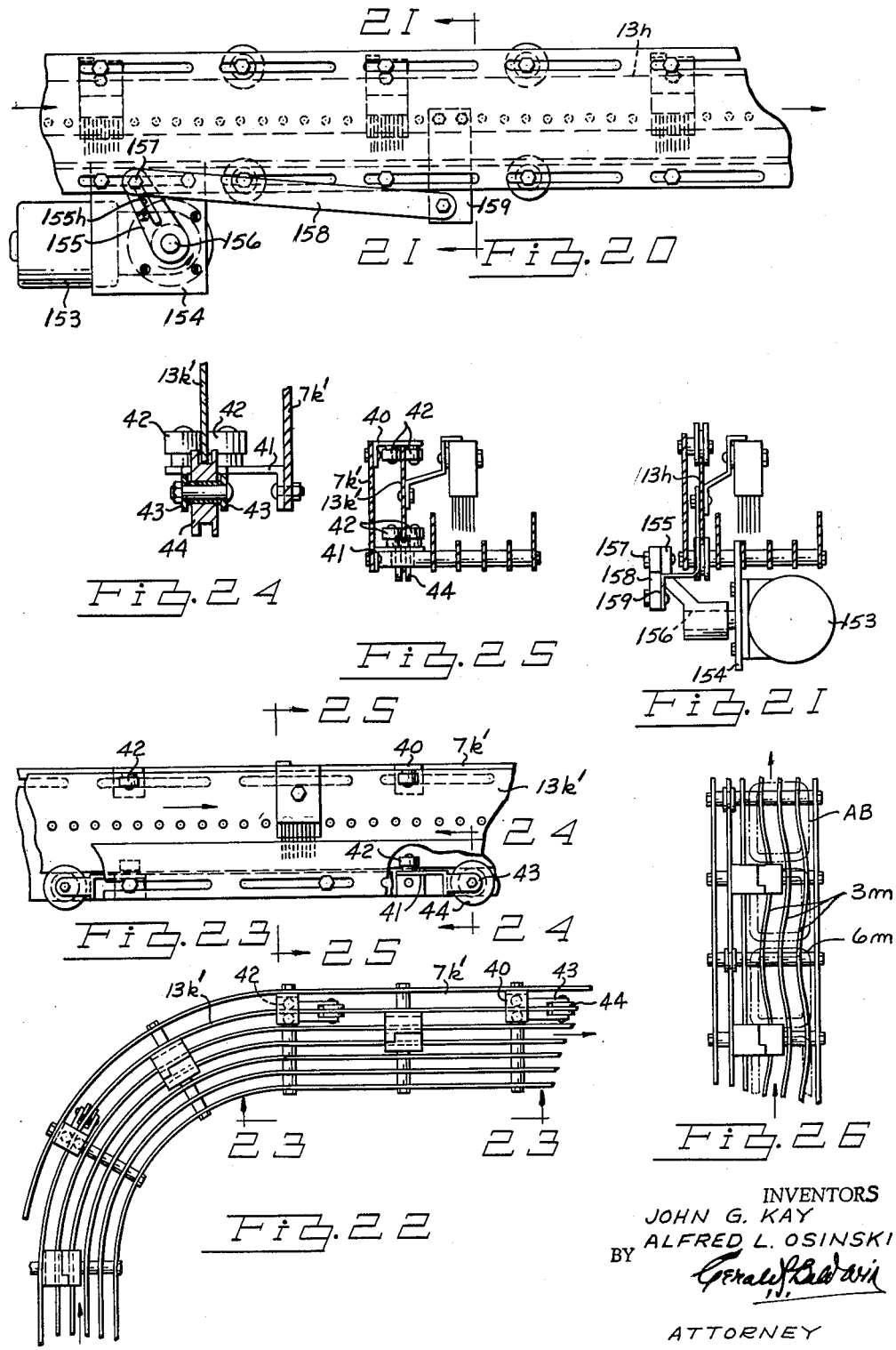

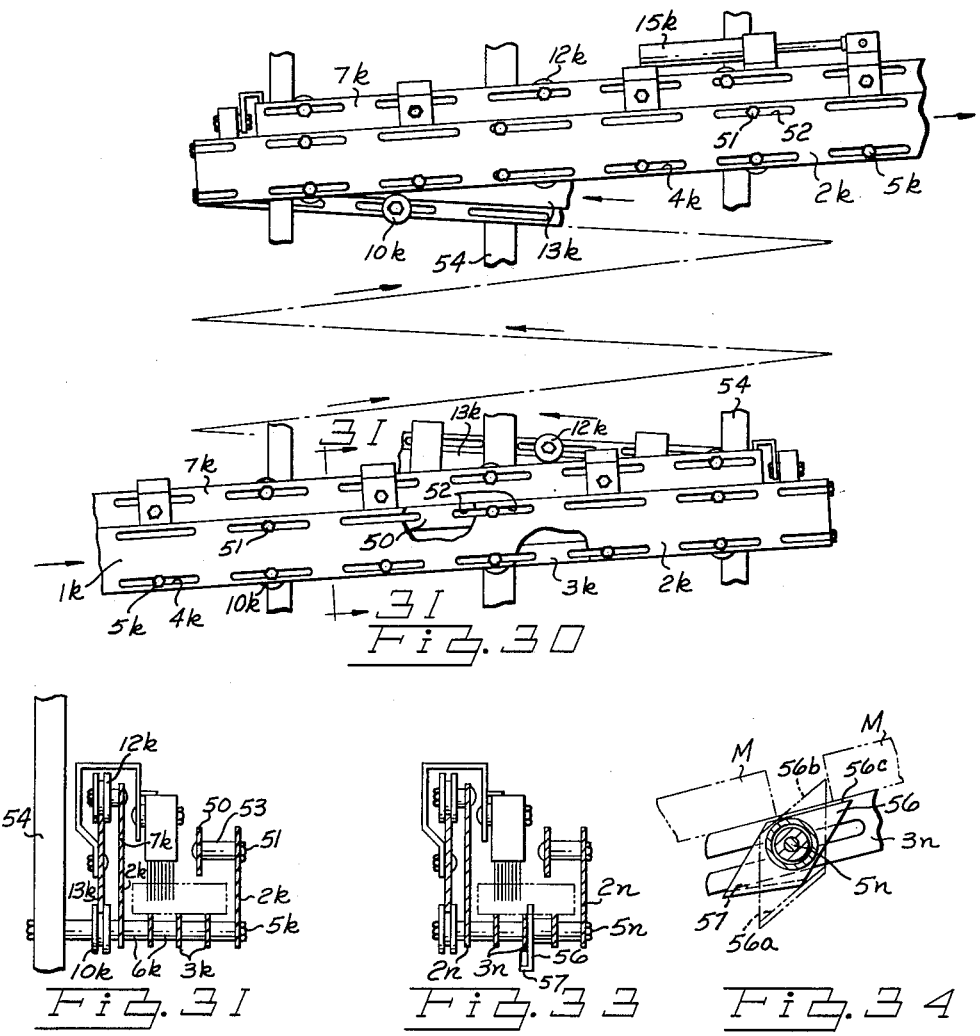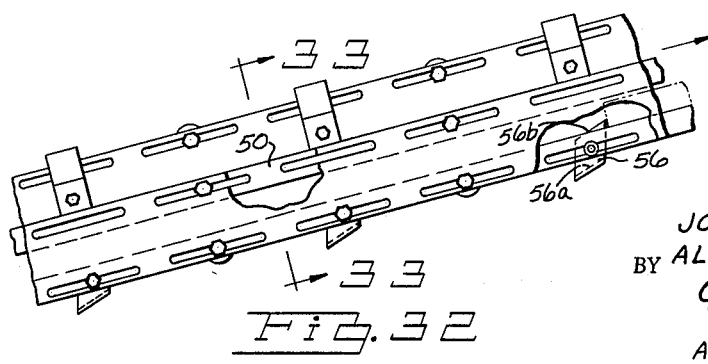

INVENTOR.
JOHN G. KAY
BY ALFRED L. OSINSKI

ATTORNEY

United States Patent Office 3,128,875
Patented Apr. 14, 1964

3,128,875
RECIPROCATING PUSHER-TYPE CONVEYOR
John G. Kay, Detroit, and Alfred L. Osinski, Warren, Mich., assignors to F. Jos. Lamb Company, Detroit, Mich., a corporation of Michigan
Filed Oct. 30, 1961, Ser. No. 148,339
12 Claims. (Cl. 198—221)

This invention relates to improvements in conveyors. It is an object of the invention to provide a novel form of conveyor including at least one runway and transfer means mounted for reciprocation for advancing workpieces step by step along a runway.

Another object of the invention is to provide a conveyor wherein the runway is resilient so that it may be straight, or flexed to extend around a curve or curves along at least a portion of its length, or which may be wound in substantially helical form to extend around one or more complete turns; wherein a transfer rail is mounted for reciprocation relative to the runway so that it extends parallel with straight portions and coaxial with curved portions thereof throughout its movement; and wherein a plurality of longitudinally spaced feeding members are carried by the transfer rail for advancing workpieces step by step along the runway.

A further object of the invention is to provide a conveyor including a runway upon which workpieces may remain stationary for prolonged periods without fear of their finished surfaces becoming marred or defaced by continuous operation of the reciprocated means tending to advance them.

Another object of the invention is to provide a conveyor including a plurality of runways along each of which workpieces are adapted to be advanced step by step by a plurality of spaced feeding members all reciprocated by a common transfer rail; and wherein the feeding members over some of the runways may be arranged to advance workpieces therealong in one direction, and those over other runways to advance workpieces therealong in the opposite direction, upon each reciprocation of the transfer rail.

Yet another object of the invention is to provide a very versatile form of conveyor which may in addition be employed as a very satisfactory live storage unit and as an elevator particularly if the runway is coiled substantially helically around one or more turns.

With these and other objects and advantages in view which will become apparent as the specification proceeds, the invention is hereinafter more fully described with the aid of the accompanying drawings, in which:

FIGURE 1 shows a partial plan view of the conveyor laterally flexed in one manner along a portion of its length.

FIGURE 2 is a partial plan view of the conveyor laterally flexed in another manner along portions of its length.

FIGURE 3 is a partial plan view of a modified form of the conveyor which is laterally flexed throughout its length.

FIGURE 4 shows a modified form of the conveyor having a plurality of parallel runways along each of which workpieces are adapted to be moved.

FIGURE 5 shows another modification including a conveyor having two runways and means for moving workpieces in one direction along one runway while workpieces on the other runway are moved in the opposite direction.

FIGURE 6 is an enlarged side elevation taken on the line 6—6 of FIGURE 1.

FIGURE 7 is an enlarged side elevation on the line 7—7 of FIGURE 3.

FIGURE 8 is an enlarged section on the line 8—8 of FIGURE 4.

FIGURE 9 is an enlarged side elevation on the line 9—9 of FIGURE 5.

FIGURE 10 is a plan view on the line 10—10 of FIGURE 6.

FIGURE 11 is a section on the line 11—11 of FIGURE 6, and

FIGURES 12 and 13 are enlarged sections taken on the lines 12—12 and 13—13, respectively, of FIGURE 6.

FIGURE 14 is a section on the line 14—14 of FIGURE 7.

FIGURE 15 is an enlarged section on the line 15—15 of FIGURE 8.

FIGURE 16 is a section on the line 16—16 of FIGURE 9.

FIGURES 17 and 18 are side elevations on the lines 17—17 and 18—18, respectively, of FIGURE 16 showing the feeding members.

FIGURE 19 is a sectional view showing another slightly modified arrangement.

FIGURE 20 shows a modified form of the actuating means for the transfer rail, and FIGURE 21 is a section on the line 21—21 of FIGURE 20.

FIGURE 22 is a plan view of a modified form of the transfer rail guiding means.

FIGURE 23 is a side elevation on the line 23—23 of FIGURE 22.

FIGURES 24 and 25 are sections on the lines 24—24 and 25—25, respectively, of FIGURE 23.

FIGURE 26 is a plan view of a runway showing a slight modification.

FIGURE 27 is an enlarged section on the line 27—27 of FIGURE 8.

FIGURE 28 is a section on the line 28—28 of FIGURE 6.

FIGURE 29 is a perspective view showing one of the feeding members in FIGURE 6.

FIGURE 30 is a side view of another modified form of the invention, and

FIGURE 31 is an enlarged section on the line 31—31 of FIGURE 30.

FIGURE 32 is a side view of the runway when inclined showing a retaining rail and a stop means mounted thereon.

FIGURE 33 is an enlarged section on the line 33—33 of FIGURE 32, and

FIGURE 34 is an enlarged side view of the stop means.

Figure 35:
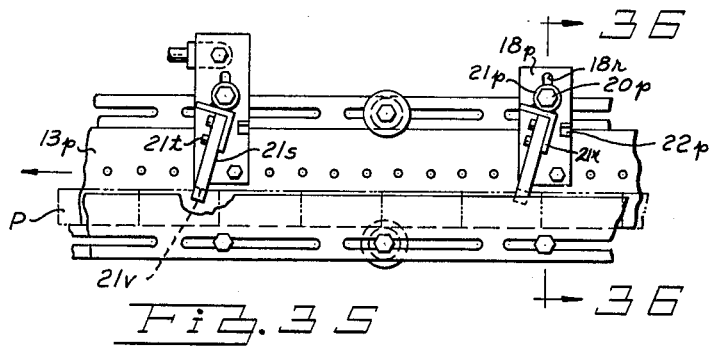
Figure 37:
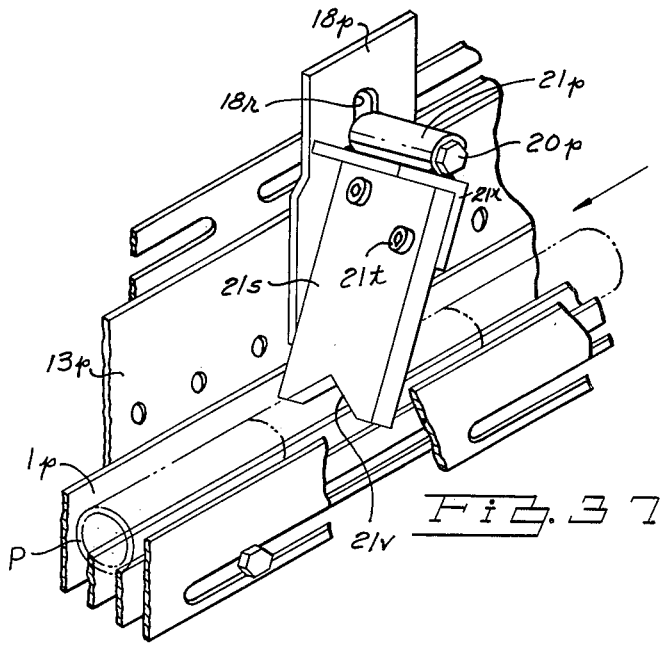
Figure 36:
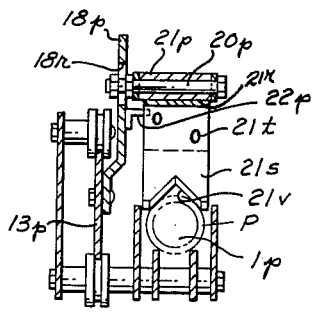

FIGURE 35 is a side view of part of the conveyor showing a modified form of the feeding members, FIGURE 36 is a section on the line 36—36 of FIGURE 35, and FIGURE 37 is an enlarged perspective view showing the feeding member.

Referring particularly to FIGURES 1, 6, 10, 11, 12, 13, 28 and 29, 1 designates a runway which is substantially horizontal, and consists of spaced parallel guide rails 2 longitudinally between which a plurality of carrier rails 3 extend. Both the guide rails and the carrier rails have longitudinal slots 4 formed therethrough adjacent their undersides through which bolts 5 extend. Mounted on the bolts are spacers 6 which retain the rails 2 and 3 uniformly spaced from one another. A supporting rail 7 substantially the same length as the guide rails 2 is also provided having a series of longitudinal slots 8 therethrough adjacent its lower margin through which the bolts 5 also pass. This supporting rail is outwardly spaced from one of the guide rails 2 and formed therethrough adjacent its upper margin and parallel with the slots 8 are other slots 9. Mounted for rotation on some of the bolts 5 between the supporting rail and the adjacent guide rail are lower flanged rollers 10, and mounted on bolts 11 extending through some of the slots 9 are upper flanged rollers 12 each of which is preferably in vertical alignment with one of the lower rollers 10. 13 denotes a transfer rail which is usually of slightly less length than the guide rails 2 and has its upper and lower margins supported for longitudinal movement by and between the rollers 12 and 10. The transfer rail is adapted to be reciprocated relative to the rails 2, 3, and 7 by means hereinafter described. As will be noted from FIGURE 1 the runway and the supporting rail are adapted to be laterally flexed and retained in their flexed forms by the bolts 5, and the transfer rail 13 supported by the rollers 10 and 12 conforms to the curvature of the runway and supporting rail as it is reciprocated. For that reason the rails 2, 3, 7 and 13 are resilient and are preferably made of spring steel.

Suitable reciprocating means are mounted on the supporting rail 7 for moving the transfer rail 13. The reciprocating is preferably connected to the transfer rail somewhat nearer to the extremity of the conveyor towards which workpieces are to be moved than towards its opposite extremity, as it is usually more satisfactory to pull the major portion of the transfer rail when it is under load than to push it.

As may be clearly seen from FIGURES 6, 10 and 11, a mounting 14 is secured to the supporting rail 7 which carries a cylinder 15 from which a piston rod 16 extends. Projecting from the piston rod is a horizontal drive pin 17 connected to a bracket 18 which is in turn secured to the transfer rail 13. Extending also from the bracket 18 is a pivot pin 20 on which a feeding member 21, in this case a brush having resilient bristles 19, is dependingly mounted, and projecting from the bracket is a stop 22, see also FIGURE 29, which prevents the brush from turning in one direction when extending substantially vertically downward but permits it some turning movement in the opposite direction. Thus as the transfer rail by the piston rod in the direction in which workpieces are to be moved by the brush the latter is held by the stop in its downward operating position, and when the piston is moved in the opposite direction the brush is free to turn about its pivot axis to travel back over workpieces on the runway while the said workpieces remain stationary. Additional brackets 18a, as shown in FIGURES 6 and 13 are secured at spaced intervals along the transfer rail 13. Each bracket 18a has a stop 22a thereon to limit the pivotal movement of a feeding member or brush 21a mounted on a pin 20a which extends through the said bracket.

In this case the means employed for reciprocating the piston rod 16 in its cylinder 15 is as follows. A well known 4-way pneumatic valve 24 is suitably secured on the supporting rail 7. This valve is connected in the conventional manner to opposite extremities of the cylinder 15 by connections 25 and 26, and has an intake and an exhaust connection 27 and 28, respectively. At each extremity the valve has an outwardly projecting button 29 by inward movement of each of which in turn the direction of air flow through the connections 25 and 26 is reversed. Trips 30, each to engage one of the buttons 29 are mounted on the transfer rail 13 for longitudinal adjustment, so that the length of stroke of the piston rod, and thus of the transfer rail, may be regulated. The length of stroke of the transfer bar should in most cases be slightly greater than that of one of the workpieces being transported along the conveyor.

From the foregoing it will be seen that when a number of workpieces are resting on the carrier rails 3 that, due to the flexibility of the bristles of the brushes, the conveyor and particularly its discharge end, may be employed for the storage of workpieces without any fear of finished surfaces thereon becoming marred or damaged if the conveyor is left running for prolonged periods. If workpieces such as the connecting rods shown at AA in FIGURE 11 have small ends thicker than their large ends, the central carrier rail may be set slightly lower than the side carrier rails to guide the small ends while the large ends are maintained substantially longitudinal by the guide rails. It is of course understood that the conveyor may be somewhat longitudinally inclined, either upwardly or downwardly, towards its discharge end, and that the bristles of the brushes are sufficiently strong to satisfactorily handle the slightly increased load when travelling up a slight incline. It is also found that no appreciably greater amount of power is required to reciprocate the transfer rail, or portions thereof, around normal curves around which portions of the rails 2, 3 and 7 extend.

The only difference in FIGURE 2 is that the runway 1 is differently curved; all the rails 2, 3, 7 and 13 are mounted in exactly the same manner as are the cylinder 15, the brushes 21 and 21a and their coacting parts.

FIGURES 3, 7 and 14 show a modification wherein the runway 1b is continuously curved throughout its length, and consequently a different arrangement is employed for reciprocating the transfer rail. In this instance the cylinder 15b is pivoted about a vertical pin 14a projecting upwardly from the mounting 14b secured on the supporting rail 7b, and the lower extremity of the piston rod 16b is provided with a vertical drive pin 17b which is rotatable in the bracket 18b on which one of the brushes 21b is mounted as before. Otherwise the construction is the same as that already described.

In FIGURES 4, 8, 15 and 27 a modification is shown wherein a plurality of runways are provided and common operating means extend across the entire width of the conveyor for supporting and reciprocating a plurality of transversely arranged feeding members or brushes with one brush of each set dependingly arranged over each runway. This arrangement includes a plurality of guide rails 2d having carrier rails 3d between each adjacent pair, and the rails all being held in spaced relation by bolts 5d having spacers 6d thereon. Mounted on the opposite extremities of the bolts 5d and extending substantially throughout the length of the rails 2d and 3d are supporting rails 7d. Rotatably mounted on the outer extremities of some of the bolts 5d are lower flanged rollers 10d, and rotatably mounted on the supporting rails 7d vertically above the rollers 10d are upper flanged rollers 12d. Between the rollers 10d and 12d on each side of the conveyor a transfer rail 13d is provided. The brackets, which again are longitudinally spaced, each consist of a transversely aligned pair of uprights 18d each secured to one of the transfer rails 13d and having their upper extremities connected to a tie member 32. Suitably secured at transversely spaced intervals to each tie member (only two of which are shown in FIGURE 4) are depending arms 33 arranged in spaced pairs. Extending horizontally through each pair of arms is a pivot pin 20d to support a feeding member or brush 21d. In order to facilitate reversal of direction in which the brushes are free to turn from their downward positions a different form of stop is employed for halting rotation of the brushes in one direction. As will be clearly seen from FIGURE 27 one side of the top of each brush is provided with a radius as shown at 21c to permit rotation of the brush in an anti-clockwise direction when hanging vertically, at which time the opposite side of the top of the brush is horizontal and lies contiguous to the tie member 32 so that it is held against rotation in a clockwise direction. Obviously upon removal of the pivot pin 20d the brush may be removed and turned around so that the radius portion 21c is on the left hand side (FIGURE 27) and the brush is free to turn in a clockwise direction and is held against anti-clockwise movement. This is of importance in conveyors having a plurality of runways as it is often desirable that workpieces flow along some runways in one direction and in the opposite direction along others; moreover it is often necessary to change the direction of flow of the workpieces along some of the runways.

Extending downward from one opposed pair of brackets 18d and secured thereto is a yoke 34 to which a clevis 35 on the front extremity of a piston rod 16d is connected, so that upon admission of fluid under pressure alternately to opposite extremities of a cylinder 15d through connections 25d and 26d the transfer bars are reciprocated. The means for controlling the length of the stroke of the piston rod and transverse rails is not shown, since it is the same as that already shown and described.

Referring to the modification shown in FIGURES 5, 9, 16, 17 and 18. In this instance two parallel runways are provided along one of which workpieces are moved in one direction while workpieces on the other runway are moved in the opposite direction by feeding members or brushes actuated through a common transfer rail. The transfer rail is reciprocated by a cylinder mounted centrally and longitudinally beneath the runways. Opposed guide rails 2e define opposite sides of one runway, and guide rails 2f and 2g, parallel with the rails 2e, define opposite sides of a second runway. Extending longitudinally between the guide rails 2e, and again between the guide rails 2f and 2g, are a plurality of carrier rails 3e. All these rails are held in spaced relation by bolts 5e having spacers 6e thereon in the manner already described. Mounted on some of the bolts 5e between the guide rails 2f and the guide rail 2e adjacent thereto are lower flanged rollers 10e, and mounted for rotation on the supporting rail 7e which in this case is integral with and forms an upward projection of the guide rail 2f, and spaced vertically above the lower rollers 10e are upper flanged rollers 12e. Mounted for longitudinal movement between and supported by the rollers 10e and 12e is a transfer rail 13e, and spaced brackets 18e are mounted on the latter. Feeding members or brushes 21e are pivotally mounted on pins 20e extending through the brackets 18e on which stops 22e are also provided. As shown in FIGURES 17 and 18 the brushes shown in this instance are the same as those in FIGURE 27. Depending from some of the bolts 5e is a mounting 14e which supports a cylinder 15e the piston rod 16e of which is connected to a bracket 18f extending from the transfer rail 13e, and, as before, buttons 29e extending from opposite extremities of the valve 24e are adapted to be actuated by longitudinally adjustable trips 30e on the transfer rail 13e.

The modification in FIGURE 19 shows an arrangement very similar to that in FIGURE 16 except that only one runway 1g is provided and the cylinder 15g is mounted thereunder. The bracket 18g is also differently shaped to extend laterally over both the transfer rail 13g and the supporting rail 7g.

FIGURES 20 and 21 show a modification wherein a different drive means is employed for actuating the transfer rail. A motor driven reducer unit 153 is secured to a mounting 154 dependingly supported by the runway and has a crank 155 on its drive shaft 156 for rotation therewith. Extending through the crank shaft adjacent its outer extremity is a pin 157 on which one extremity of a connecting rod 158 is mounted for rotation. The opposite end of the rod 158 is pivotally secured to a strap 159 fixedly attached to and projecting from the transfer rail 13h. Thus as the crank is turned the transfer rail is reciprocated. It will also be noted that the crank is radially slotted at 155h adjacent its outer extremity for the pin 157 so that the length of the stroke of the connecting rod, and thus of the transfer rail, may be adjusted.

Referring now to FIGURES 22 to 25, inclusive, wherein a modification is shown which includes different roller means for supporting the transfer rail, and is primarily intended for use in cases where the path to be followed by the transfer rail extends around quite sharp curves. Mounted on the supporting rail 7k' and extending at right angles therefrom and passing immediately above and beneath the upper and lower margins of the transfer rail 13k' are upper and lower plates 40 and 41, respectively. These plates each support a pair of horizontally opposed rollers 42 one on each side of the transfer rail. Moreover each roller on each lower plate is preferably in axial alignment with one on the upper plate above it. In addition each lower plate is provided with bearings 43 to support a vertical flanged roller 44 one of which is positioned adjacent each pair of lower rollers 42 to support and insure free longitudinal movement of the transfer rail 13k'.

FIGURE 26 shows another slight modification wherein each carrier rail 3m is laterally and alternately flexed in opposite directions by the use of spacers 6m of different widths. In this manner the portions of the bearing surfaces of workpieces AB which rest upon the carrier rails change constantly as the workpieces are advanced along the runways. In that way any tendency for the finished undersides of the workpieces becoming marred by the carrier rails as they travel therealong is materially reduced.

FIGURES 30 and 31 show another modification wherein the runway and the transfer rail are substantially helically wound so that a greater increase in elevation is obtained in a shorter distance longitudinally between the inlet and outlet extremities of the runway than would otherwise be feasible. Moreover this form of conveyor provides greater storage than one extending substantially directly between its opposite extremities; and again, due to the arrangement of the transfer rail and its sweeping means there is no danger of workpieces becoming damaged by continuous operation of the sweeping means if the runway remains full of undischarged workpieces for quite a prolonged period.

The runway 1k, as before, consists of opposed guide rails 2k with carrier rails 3k spaced between them. These rails are made of resilient material, preferably spring steel, so that they may be uniformly and substantially helically wound, and maintained in spaced relation throughout their length by bolts 5k on which spacers 6k are provided. In the instance shown the supporting rail 7k is integral with and forms an upward extension of one of the guide rails 2k, though of course if desired it may be a separate resilient rail as shown in FIGURES 11 and 14. The supporting rail 7k supports the upper flanged rollers 12k for rotation while the lower flanged rollers 10k are mounted on some of the bolts 5k. The transfer rail 13k is mounted for longitudinal movement between the rollers 10k and 12k, or, if the radius of the helical turns is relatively short, the roller arrangement shown in FIGURES 22 to 25, inclusive, may be substituted. In FIGURE 30 a cylinder is indicated at 15k which is connected as before to the transfer rail for reciprocating the brushes as before described.

50 denotes a retaining rail for preventing workpieces being advanced along the runway from climbing onto others ahead. The rail, which is substantially the same length as the runway, is also resilient and is held spaced from the guide rail 2k farthest from the transfer rail 13k by bolts 51 which pass through elongated slots 52 formed through both the said guide rail and the retaining rail. Spacers 53 on the bolts hold the retaining rail uniformly and correctly spaced from the guide rail. The slots 52, like the slots 4k or the slots 4 in FIGURE 1, are longer than the spacing between adjacent slots so that at all times and along all curves substantially uniformly spaced bolts may be inserted through the rails 2k and 50. This same longitudinal spacing of slots also obtains in the case of the slots 52, and to the spacing of the slots through the supporting rail in cases where the said rail is not integral with one of the guide rails. 54 indicates legs for supporting the runway; in the present instance they are secured to the runway by some of the bolts 5k.

FIGURES 32, 33 and 34 show the conveyor somewhat upwardly inclined towards its discharge extremity, and include not only the retaining rail just described but also a stop means for preventing workpieces sliding downward against their normal direction of travel during the return stroke of the brushes. The retaining rail is of course applicable to all forms of the conveyor herein shown, as also is the stop means provided the runway is inclined and is adapted to transport workpieces upward therealong.

The stop means consists of a vertical plate 56 pivoted upon one of the bolts 5n by which the carrier rails 3n and the guide rails 2n are held in spaced relation. The plate along its lower margin is provided with a laterally projecting lip 57 one extremity or the other of which is adapted to engage the underside of one of the carrier rails 3n contiguous to which it is arranged, to limit the pivotal movement of the plate in one direction or the other. In its normal position the plate hangs in its position shown at 56a in FIGURE 32 and as indicated in FIGURE 34, due to the weight of the lip and the location of the aperture through which the bolt 5n passes. Normally the plate 36 is so positioned, and tends to return to the position, wherein the rear extremity of the upper margin is somewhat below the top of the carrier rails, and the plate extends forwardly and upwardly relative thereto so that its front extremity acts as a stop to prevent downward passage of workpieces M on the runway from above the plate. Then the front extremity of the lip 57 rests against the underside of the contiguous carrier rail. As a workpiece approaches the plate from below it passes over the rear extremity of the latter, and, as it continues its upward travel, gradually turns the plate about its pivot axis to its position 56b when the rear extremity of the lip lies immediately beneath the contiguous carrier rail.

The modification in FIGURES 35 to 37, inclusive, shows a feeding member primarily adapted for advancing workpieces which are of substantially uniform diameter throughout their length. As before brackets 18p are secured to a transfer rail 13p. Each feed member comprises a bearing 21p integral with a mounting 21r, and secured to the latter by fastening means 21t is a depending blade 21s having a substantially V-shaped transverse notch 21v formed in its underside intermediately of its width. Each bearing 21p is mounted on a pivot pin 20p which extends through a vertical slot 18r formed in one of the brackets. The pin is of course vertically adjustable in the slot so that the height of the feed member may be adjusted to suit the diameter of the workpieces P on the runway 1p. The undersides of the blades 21s are somewhat downwardly and forwardly inclined in the direction in which the workpieces are to be advanced, when resting upon them. Moreover the blades are resilient, preferably made of rubber or a rubber-like composition, and are somewhat readily flexible. When the blades are on workpieces the opposite sides of their notches 21v rest against opposed opposite sides of the said workpieces. As soon as the blades commence their forward stroke to advance the workpieces their lower extremities first move somewhat rearwardly relative to their mountings and then flex forwardly and downwardly in the direction in which the workpieces are to be advanced, thereby frictionally engaging opposite sides of the workpieces so that the latter move uniformly forward with the blades. This grip is maintained through the advancing stroke. Upon their return stroke the blades slide freely back over the stationary workpieces. Stops 22p are provided on the brackets 18p to contact the mountings 21r and limit the pivotal movement of the blades in the opposite direction to that in which the workpieces are adapted to be advanced.

From the foregoing it will be clearly seen that this form of conveyor may be employed when the runway is straight, curved at least in part, or substantially helically wound, and when it is mounted horizontally or somewhat inclined longitudinally in either direction. Moreover due to the use of resilient rails, including the supporting rails, having elongated slots through them these rails may be readily flexed to the desired curvature and held coaxial by the bolts which extend through them.

What we claim is:

1. A conveyor comprising a runway curved in a horizontal plane along at least a portion of its length, a resiliently flexible transfer rail, a supporting rail fixedly mounted in relation to the runway and supporting the transfer rail for reciprocation, means on the supporting rail for maintaining the transfer rail uniformly spaced along its entire length from the runway throughout its movement, means for reciprocating the transfer rail, a plurality of longitudinally spaced feeding members for advancing workpieces along the runway, brackets on the transfer rail, pivot means on the brackets supporting the feeding members, and stops on the brackets for preventing pivotal movement of the feeding members past their operative positions when the transfer rail is moving in one direction.

2. The combination in claim 1, wherein the means on the supporting rail for maintaining the transfer rail uniformly spaced from the runway includes a plurality of guide rollers engaging said transfer rail.

3. The combination in claim 1, wherein the means on the supporting rail for maintaining the transfer rail uniformly spaced from the runway includes plates extending from the supporting rail above and beneath the transfer rail and across said transfer rail, and opposed pairs of horizontal rollers mounted on the plates for engaging opposite sides of the transfer rail.

4. A conveyor comprising a substantially helically wound runway, a substantially helically wound supporting rail fixedly mounted relative to the runway, a resiliently flexible transfer rail, means on the supporting rail for supporting the transfer rail for reciprocation including means for maintaining the transfer rail uniformly spaced from the runway throughout its length, means for reciprocating the transfer rail, longitudinally spaced brackets fixed on the transfer rail, feeding members mounted for movement on the brackets adapted to advance workpieces along the runway when the transfer rail is moving in one direction, and means on the brackets for preventing the feeding members moving past their operative positions when the transfer rail is moving in said one direction.

5. A conveyor comprising a substantially helically wound runway, a substantially helically wound supporting rail integral with the runway, a resiliently flexible transfer rail, flanged rollers mounted along the supporting rail for supporting the transfer rail for reciprocation, longitudinally spaced brackets on the transfer rail, means for reciprocating the transfer rail, feeding members for advancing workpieces along the runway pivoted on said brackets, and stops on the brackets for preventing the feeding members moving past their operative positions when the transfer rail is moving in one direction.

6. A conveyor comprising a runway having a portion which is curved in a horizontal plane, a support rail paralleling the curved portion of the runway and fixed adjacent thereto, a resiliently flexible transfer rail, guide means on said support rail for supporting the transfer rail for reciprocation in a path paralleling the curved portion on the runway, means for reciprocating said transfer rail and feed means supported on said transfer rail for reciprocation therewith, said feed means extending into the curved portion of the runway for engaging and advancing work pieces along the runway when the transfer rail is moved in one direction of its reciprocating movement.

7. The combination set forth in claim 6 wherein said transfer rail comprises a strip of spring material disposed in a generally upright position on the support rail and curved laterally to parallel the curvature of the curved portion of the runway.

8. The combination set forth in claim 6 wherein said runway includes at least one carrier rail on which the workpieces are adapted to be supported and along which they are adapted to be advanced, said support and transfer rails being disposed along one side of said runway, said feed means comprising a plurality of brackets fixed on the transfer rail and extending laterally over the runway so as to generally overlie said carrier rail, each bracket having a depending pusher member thereon which extends downwardly toward said carrier rail.

9. The combination set forth in claim 8 wherein said pusher member comprises a flexible bristle brush, the bristles being sufficiently firm to bodily advance the workpieces along the runway when the flow of workpieces is unobstructed and being sufficiently flexible to wipe over the workpieces when the flow of workpieces in the advancing direction is obstructed.

10. The combination in claim 8, wherein the carrier rail is flexed laterally alternately in opposite directions throughout at least a portion of its length.

11. The combination set forth in claim 7 wherein the runway also includes a generally straight portion joined to the curved portion thereof, said support extending along and in parallel relation to both the straight and curved portions of the runway, said transfer rail also extending along and parallel to both the straight and curved portions of the runway.

12. The combination set forth in claim 7 wherein said guide means comprises a plurality of rollers on the support rail and engaging the upper and lower edge portions of the transfer rail.

References Cited in the file of this patent

UNITED STATES PATENTS

| | | |
|---|---|---|
| 1,156,544 | Nevill | Oct. 12, 1915 |
| 2,609,916 | Kendael | Sept. 9, 1952 |
| 2,815,841 | Dabick | Dec. 10, 1957 |

FOREIGN PATENTS

| | | |
|---|---|---|
| 102,588 | Austria | Feb. 25, 1926 |
| 298,720 | Switzerland | July 16, 1954 |